US005595362A

United States Patent [19]
Rinderer et al.

[11] Patent Number: 5,595,362
[45] Date of Patent: Jan. 21, 1997

[54] ELECTRICAL BOX MOUNTING BRACKET

[75] Inventors: Eric R. Rinderer, Highland; Martin L. Witherbee, Edwardsville, both of Ill.

[73] Assignee: B-Line Systems, Inc., Highland, Ill.

[21] Appl. No.: 991,731

[22] Filed: Dec. 17, 1992

[51] Int. Cl.$^6$ .................................................. G12B 9/00
[52] U.S. Cl. .................................... 248/27.1; 220/3.9
[58] Field of Search ........................ 248/27.1; 411/533, 411/539, 541; 220/3.9; 403/315, 316, 11

[56]         References Cited

U.S. PATENT DOCUMENTS

| | | |
|---|---|---|
| 1,206,431 | 11/1916 | Graybill . |
| 1,225,525 | 5/1917 | Sweet . |
| 1,620,063 | 3/1927 | Bowers . |
| 1,705,768 | 3/1929 | Johnson et al. . |
| 1,774,934 | 9/1930 | Mangin . |
| 1,816,584 | 7/1931 | Hussar . |
| 1,855,751 | 4/1932 | Buchanan . |
| 1,920,811 | 8/1933 | Schwabacher ........................... 247/15 |
| 1,961,728 | 6/1934 | Arnest et al. .............................. 247/19 |
| 2,126,114 | 8/1938 | Jett ............................................ 247/21 |
| 2,214,968 | 9/1940 | MacMillen ............................... 220/3.9 |
| 2,233,548 | 3/1941 | Mroziak ................................... 248/221 |
| 2,252,953 | 8/1941 | Walters ..................................... 220/3.9 |
| 2,299,674 | 10/1942 | Austin, Jr. ................................ 248/311 |
| 2,374,622 | 4/1945 | Rugg ........................................ 174/58 |
| 2,423,757 | 7/1947 | Dedge ...................................... 220/3.9 |
| 2,439,091 | 4/1948 | Keating .................................... 248/27 |
| 2,480,805 | 8/1949 | Buckels .................................... 248/221 |
| 2,644,600 | 7/1953 | Senif ........................................ 220/3.9 |
| 2,772,062 | 11/1956 | Bowser ..................................... 248/27 |
| 2,966,998 | 1/1961 | Schwartz .................................. 220/3.8 |
| 3,115,265 | 12/1963 | Mulkey et al. ........................... 220/3.5 |
| 3,360,151 | 12/1967 | Yznaga ..................................... 220/3.9 |
| 3,376,005 | 4/1968 | Swanquist ................................ 248/223 |
| 3,448,952 | 6/1969 | Swanquist et al. ....................... 248/27 |
| 3,474,994 | 10/1969 | Swanquist ................................ 248/205 |
| 3,588,017 | 6/1971 | O'Brien .................................... 248/205 |
| 3,588,019 | 6/1971 | Cozeck . |
| 3,596,860 | 8/1971 | MacKay ................................... 248/216 |
| 3,606,223 | 9/1971 | Havener ................................... 248/205 |
| 3,622,029 | 11/1971 | Ware ........................................ 220/3.7 |
| 3,720,395 | 3/1973 | Schuplin . |
| 3,767,151 | 10/1973 | Seal et al. ................................. 248/205 R |
| 3,780,209 | 12/1973 | Schuplin .................................. 174/51 |
| 3,913,773 | 10/1975 | Copp et al. .............................. 220/3.92 |
| 3,928,716 | 12/1975 | Marrero ................................... 174/57 |
| 4,057,164 | 11/1977 | Maier ....................................... 220/3.6 |
| 4,108,414 | 8/1978 | Grant, Sr. ................................. 248/300 |
| 4,135,337 | 1/1979 | Medlin ..................................... 52/231 |
| 4,399,922 | 8/1983 | Horsley .................................... 220/3.6 |
| 4,408,695 | 10/1983 | Balkwill et al. ......................... 220/3.3 |
| 4,447,030 | 5/1984 | Nattel ....................................... 248/27.1 |
| 4,462,564 | 7/1984 | Alves et al. .............................. 248/27.1 |
| 4,483,453 | 11/1984 | Smolik ..................................... 220/3.5 |
| 4,533,060 | 8/1985 | Medlin ..................................... 220/3.9 |
| 4,561,615 | 12/1985 | Medlin, Jr. ............................... 248/27.1 |
| 4,569,458 | 2/1986 | Horsley .................................... 220/3.6 |
| 4,572,391 | 2/1986 | Medlin ..................................... 220/3.9 |

(List continued on next page.)

Primary Examiner—Blair Johnson
Attorney, Agent, or Firm—Senniger, Powers, Leavitt & Roedel

[57]             ABSTRACT

A bracket for mounting an electrical box on a wall stud including a sheet metal plate having front and rear faces and a large central opening therein. A pair of screw opening formations is provided in the plate generally adjacent diagonally opposite corners of the central opening in the plate. Each formation includes a relatively narrow screw shank clearance slot which receives the shank of a respective box mounting screw. The plate is so configured that an electrical box may be moved to a first position in which the front of the box is closely adjacent the rear face of the plate, and then to a second position in which the shanks of the mounting screws are received in the screw shank clearance slots of respective screw opening formations and in which the front opening of the box is generally in register with the central opening in the plate. A locking device on the bracket prevents movement of the box from its second position back to its the first position for locking the box in its the second position and holding the box captive on the mounting bracket without the need to tighten the box mounting screws.

19 Claims, 4 Drawing Sheets

U.S. PATENT DOCUMENTS

| | | | |
|---|---|---|---|
| 4,603,789 | 8/1986 | Medlin, Sr. | 220/3.9 |
| 4,645,089 | 2/1987 | Horsley | 220/3.6 |
| 4,688,693 | 8/1987 | Medlin, Jr. | 220/3.9 |
| 4,732,356 | 3/1988 | Medlin, Sr. | 248/27.1 |
| 4,757,908 | 7/1988 | Medlin, Sr. | |
| 4,787,587 | 11/1988 | Deming | 248/205 |
| 4,893,777 | 1/1990 | Gassaway | 403/315 X |
| 4,964,525 | 10/1990 | Coffey et al. | 220/3.9 |
| 5,005,792 | 4/1991 | Rinderer | 248/205.1 |

5,595,362

ELECTRICAL BOX MOUNTING BRACKET

BRIEF SUMMARY OF THE INVENTION

This invention relates generally to brackets and more particularly to a mounting bracket for mounting an electrical outlet box on a wall stud.

Electrical outlet boxes are conventionally provided in two sizes. One size outlet box ("small size") is square-shaped with each side being approximately four inches long. The other size ("large size") is also square-shaped and has sides which are approximately 4 11/16 inches in length. Mounting brackets of the type shown in U.S. Pat. No. 4,357,908 are capable of mounting either size outlet box and its associated plaster ring on a wall stud. As is known in the art, the mounting bracket fastens to a stud and an outlet box (either small or large size) mounts on one surface of the bracket, usually the back surface, and a plaster ring mounts on the opposing surface of the bracket, usually the front surface of the bracket.

As shown in U.S. Pat. No. 4,757,908, threaded screws extend through slots provided in the mounting bracket for fastening the outlet box to the bracket. Before wiring the box, electricians have generally proceeded in one of two ways. Some have mounted a plaster ring on the bracket at the front of the bracket, tightened the screws to secure the box, bracket and ring together, and then wired the box. However, this method has a drawback in that the opening in the plaster ring is relatively small and limits access to the box through the front of the box, thereby making the wiring process more difficult. Another method is to tighten the screws to secure the box to the bracket without first mounting the plaster ring on the bracket. While this provides greater access to the box to facilitate wiring, the screws must later be loosened and then retightened to install the plaster ring on the bracket. This is time-consuming and inefficient.

Accordingly, among the several objects of the present invention may be noted the provision of an improved bracket for mounting an electrical outlet box on a wall stud; the provision of such a bracket having a feature adapted for locking an outlet box on the bracket without having to tighten the mounting screws on the outlet box, thereby enabling the box to be wired before a plaster ring is mounted on the bracket, and further enabling installation of the plaster ring on the bracket after the box has been wired without having to loosen and retighten the mounting screws; the provision of such a bracket which provides for more convenient and efficient installation of an outlet box on a wall stud; and the provision of such a bracket which is simple in design and construction, and easy to use.

In general, a bracket of the present invention is adapted for mounting an electrical box on a wall stud. The electrical box is of the type having side walls, a rear wall, a front opening, and a pair of box mounting screws projecting forward from the box generally adjacent diagonally opposite corners of the front opening of the box. Each screw has a screw head and a threaded shank. The bracket comprises a sheet metal plate having front and rear faces and large central opening therein. A fastening flap extends from one side of the plate for securement to a wall stud to mount the bracket on the stud in a position wherein the plate extends laterally from the stud at one side of the stud and lies in a generally vertical plane. A pair of screw opening formations is provided in the plate generally adjacent diagonally opposite corners of the central opening in the plate. Each formation includes a relatively narrow screw shank clearance slot having a width sufficient to receive the shank of a respective box mounting screw but insufficient to permit passage therethrough of the screw head. The plate is so configured that an electrical box is adapted to be moved to a first position in which the front of the box is closely adjacent the rear face of the plate and in which the heads of the box mounting screws are disposed forward of the front face of the plate. The box then is movable in a direction generally parallel to the plate from said first position to a second position in which the shanks of the screws are received in the screw shank clearance slots of respective screw opening formations and in which the front opening of the box is generally in register with the central opening in the plate. At least one locking device on the bracket prevents movement of the box from its said second position back to its said first position thereby to lock the box in its said second position and to hold the box captive on the mounting bracket without the need to tighten the box mounting screws to bring the heads of the screws into clamping engagement with the front wall of the bracket.

Other objects and features will be in part apparent and in part pointed out hereinafter.

BRIEF DESCRIPTION OF THE DRAWINGS

Corresponding reference characters indicate corresponding parts through out the several views of the drawings.

DETAILED DESCRIPTION OF THE PREFERRED EMBODIMENTS

Figure 1:
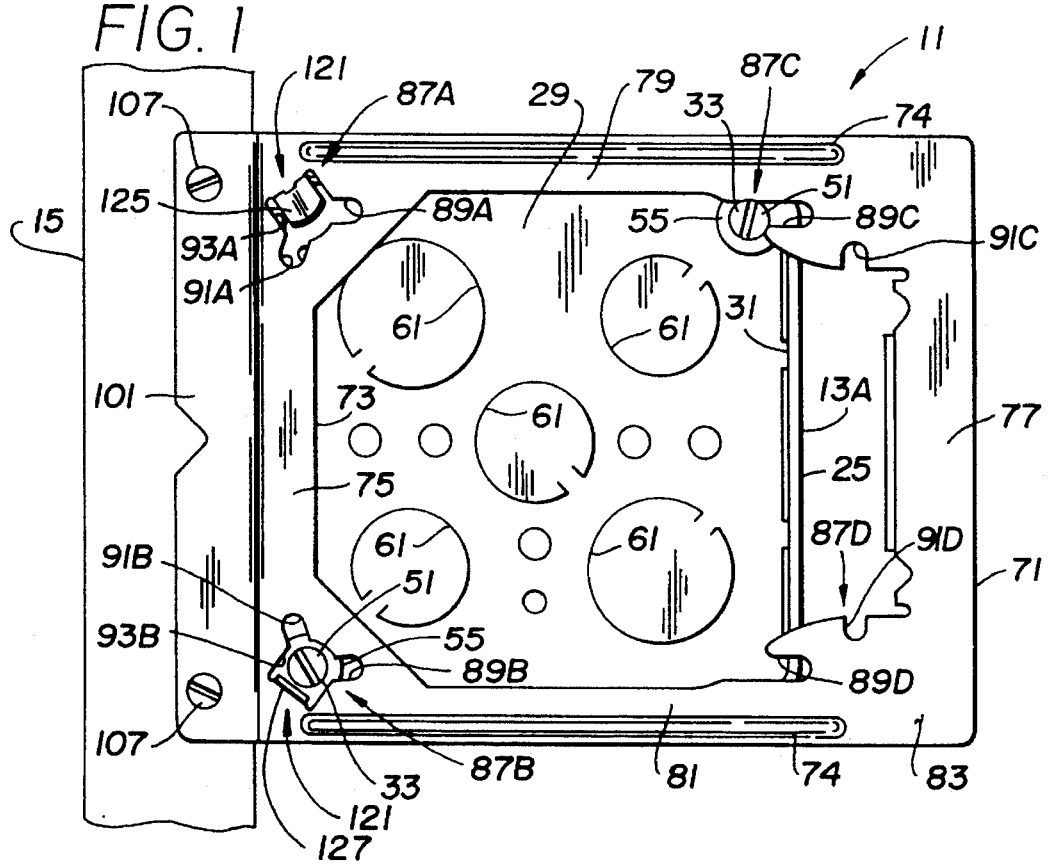
FIG. 1 is a front view of a bracket of this invention mounting an electrical outlet box, such as a small size outlet box, on a stud, the mounting bracket being shown supporting the outlet box in a first or unlocked position.

Referring now to the drawings, a mounting bracket of this invention, indicated generally at 11, is shown mounting an electrical outlet box 13A on a wall stud 15 which supports a wall 17. While the stud 15 is shown in a configuration corresponding to a metal stud, it will be understood that a bracket of this invention may also be used with wood studs. In practice, the mounting bracket 11 and the outlet box 13A are mounted on the wall stud 15 before the wall 17 is attached to the wall stud.

As is well known in the electrical equipment industry, there are two conventional or standard size outlet boxes. The first size outlet box, which may be referred to as a standard "small size" box, is shown in FIGS. 1–4, 6 and 7 is designated 13A. It has four side walls 21, 23, 25 and 27, each being approximately four inches in length and one and one-half inches in depth, a rear wall 29, a front opening 31 and a pair of outlet box mounting screws each indicated at 33 projecting forward from the box 13A generally adjacent diagonally opposite corners of the front opening of the outlet box. The second size outlet box 13B, which may be referred to as a standard "large size" outlet box (see FIG. 5), is substantially identical to the small size outlet box 13A except that its side walls 39, 41, 43 and 45 are approximately 4¹¹⁄₁₆ inches in length. Like the small size outlet box 13A, the large size outlet box 13B includes a rear wall 47, a front opening 49 and a pair of box mounting screws 33. Unless otherwise indicated the term "outlet box" as used herein shall refer to the small outlet box 13A.

Figure 5:
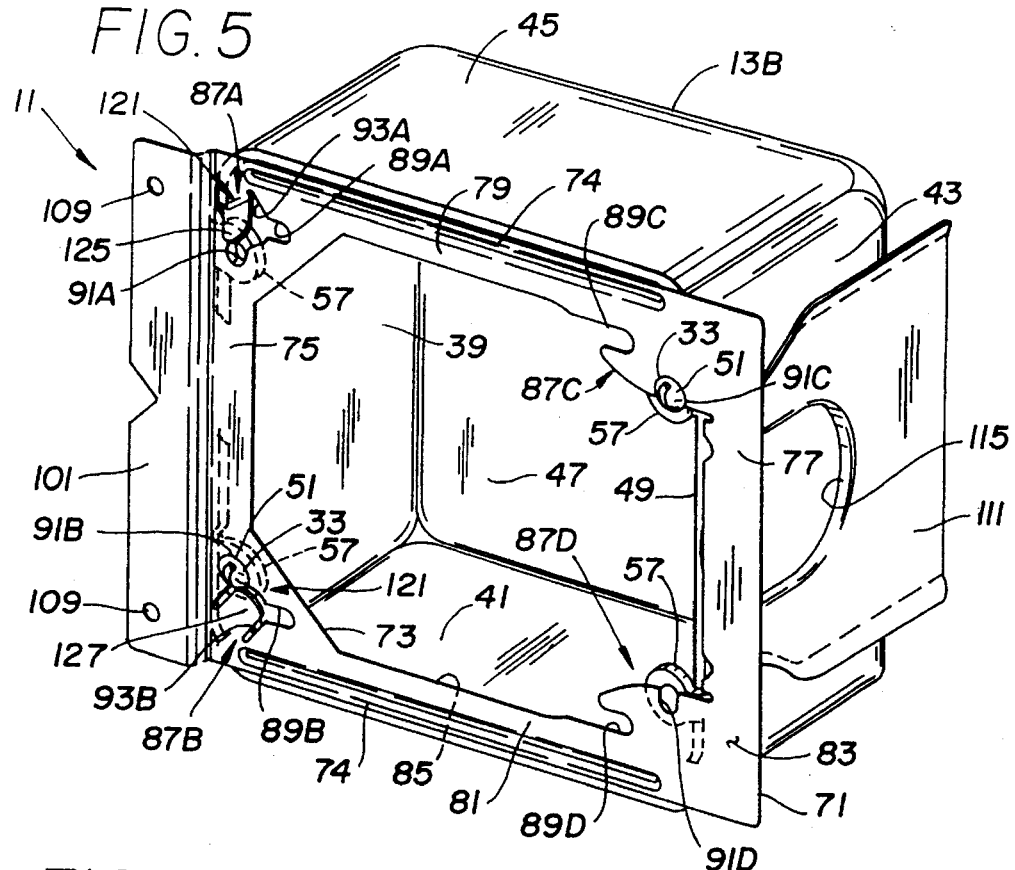
FIG. 5 is a front perspective view of the mounting bracket of FIG. 1 showing the bracket supporting a large size outlet box in its locked position.

Each mounting screw 33 is of standard construction having a screw head 51 and a threaded shank 53. The screws are threaded in openings in screw tabs projecting inwardly from the side walls of the outlet box into the front opening of the box. As shown, the small size outlet box 13A has two inwardly projecting tabs 55 located at diagonally opposite corners of the outlet box (see, e.g., FIG. 1), and the large size outlet box 13B has four inwardly projecting tabs 57 projecting from walls 39, 43 near to but spaced from the respective four corners of the outlet box (see FIG. 5). The large size outlet box 13B is typically provided with only two mounting screws 33 located at diagonally opposite tables, as shown in FIG. 5, but four mounting screws may be provided. Each tab 55, 57 has a threaded opening 59 therein for receiving the threaded shank 53 of a respective mounting screw 33 (see FIG. 8). Each size outlet box 13A, 13B is also provided with a series of knock-outs 61 which may be punched out by a person installing the assembly for making electrical connections within the outlet box and for supporting various electrical components, such as transformers.

Figure 2:
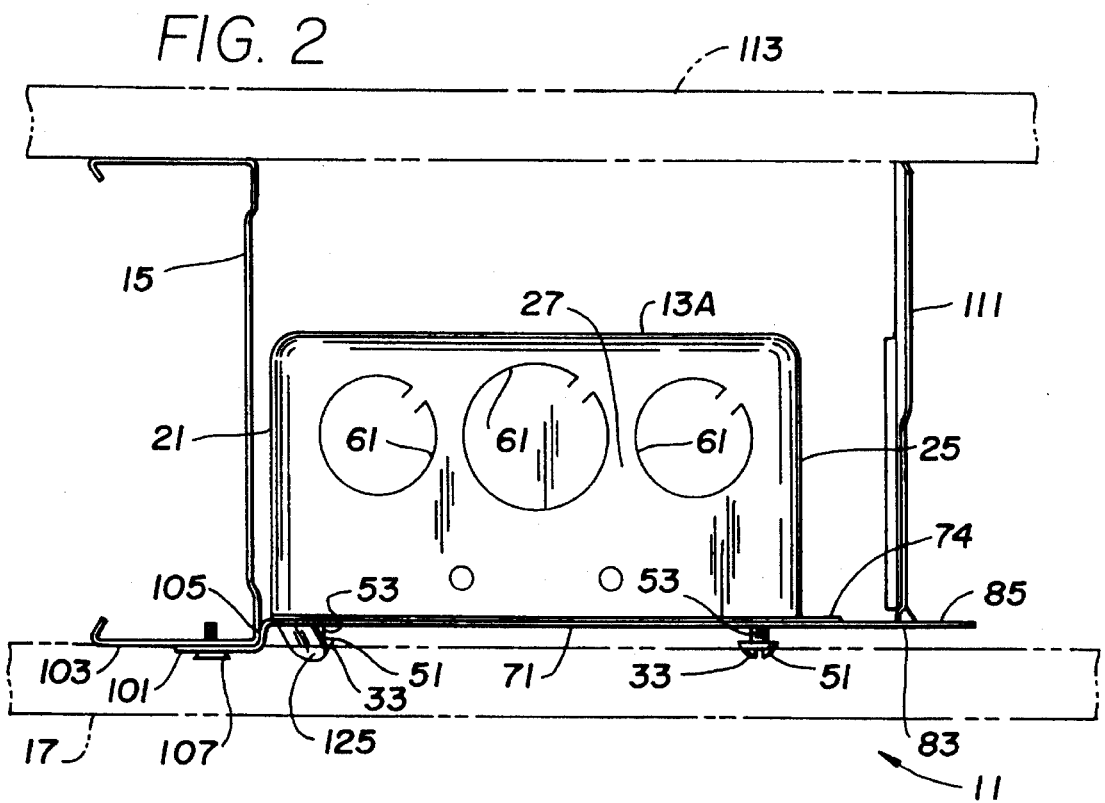
FIG. 2 is a top view of the mounting bracket shown in FIG. 1.

Referring now to FIGS. 1 and 2, the mounting bracket 11 includes a generally rectangular sheet metal plate 71 adapted to support the outlet box 13A on the stud 15. The plate 71 has a large, generally rectangular, central opening 73 therein defined by left and right edge margins 75, 77 and relatively narrower top and bottom edge margins 79, 81. Reinforcing ribs 74 are provided in the top and bottom edge margins 79, 81 for increasing the strength of the plate 71. As shown, each rib 74 extends substantially along the entire length of its respective edge margin. Each rib 74 is formed in the plate by stamping, for example. The plate 71 further includes a front face 83 which faces the forwardly positioned wall 17 after the wall is attached to the stud 15, and a rear face 85 opposite the front face. When the outlet box 13A is mounted on the bracket, the front opening 31 of the box is positioned closely adjacent to the rear face 85 of the bracket and in register with its central opening 73. As thus mounted, the interior of the outlet box 13A is accessible through the opening 73 in the plate 71.

Four screw opening formations, indicated generally at 87A, 87B, 87C and 87D, are formed in the plate 71 and are located generally adjacent the four corners of the central opening 73 of the plate. More particularly, each formation 87 includes two relatively narrow screw shank clearance slots 89, 91 having a width sufficient to receive the shank 53 of a respective box mounting screw 33 but insufficient to permit passage of a screw head 51 therethrough. Formations 87A and 87B each include a screw head clearance opening 93 in communication with an open end of each screw shank clearance opening slot 89, 91. The screw head clearance opening 93 has a width sufficient so that the head 51 of a respective mounting screw is able to pass forwardly therethrough. The outlet box 13A is mounted on the plate 71 by inserting the shanks 53 of the mounting screws 33 into any two diagonally opposite screw opening formations 87 (e.g., formations 87A, 87D or formations 87B, 87C) and tightening the mounting screws so that screw heads 51 engage the front face 83 of the plate adjacent the edges of the screw shank clearance slots 89. It is to be understood that four mounting screws 33 may be used to mount the large outlet box 13B on the mounting bracket 11. However, two diagonally positioned mounting screws are sufficient.

As shown in the drawings, the two left-hand formations 87A, 87B are formed in the plate 71 at opposite ends of the left edge margin 75. Each formation has one screw head clearance opening 93 and two screw shank clearance slots 89, 91 extending from the screw head clearance opening generally at right angles relative one another. Screw shank clearance slots 89A, 89B are arranged and configured for receiving the shank 53 of a mounting screw 33 of a standard small size outlet box 13A (see, FIG. 1), and screw shank clearance slots 91A, 91B are arranged and configured for receiving the shank 53 of a mounting screw 33 of a standard large size outlet box 13B (see FIG. 5). Each of the two right-hand formations 87C, 87D has two screw shank clearance slots 89, 91 extending from edges of the large central opening 73 generally at right angles relative to one another such that the open end of each slot is in communication with the large central opening. In these formations 87C, 87D the large central opening 73 constitutes the screw head clearance opening. Like the left-hand formations, screw shank clearance slots 89C, 89D of formations 87C, 87D are arranged and configured for receiving the shank 53 of a mounting screw 33 of a small size outlet box 13A, and screw shank clearance slots 91C, 91D are arranged and configured for receiving the shank 53 of a mounting screw 33 of a large size outlet box 13B.

The plate 71 is further provided with a fastening flap 101 extending from the left edge margin 75 of the plate for securing the plate to the wall stud 15. The fastening flap 101 enables the mounting bracket 11 to be mounted on the stud 15 in a position in which the plate 71 extends laterally from the stud at one side of the stud (e.g., the right-hand side as shown in the drawings) and lies in a generally vertical plane. As more clearly shown in FIG. 2, the fastening flap 101 is slightly forwardly offset from the plane of the plate 71 so that the plate is recessed relative to the forward edge 103 of the stud after mounting the bracket 11 on the stud. The offset forms a shoulder 105 between the left edge margin 75 of the plate and the flap 101 which warps around the edge of the stud 15. Fastening screws 107 fasten the flap 101 of the plate 71 to the stud through two small openings 109 formed in the flap.

Figure 6:
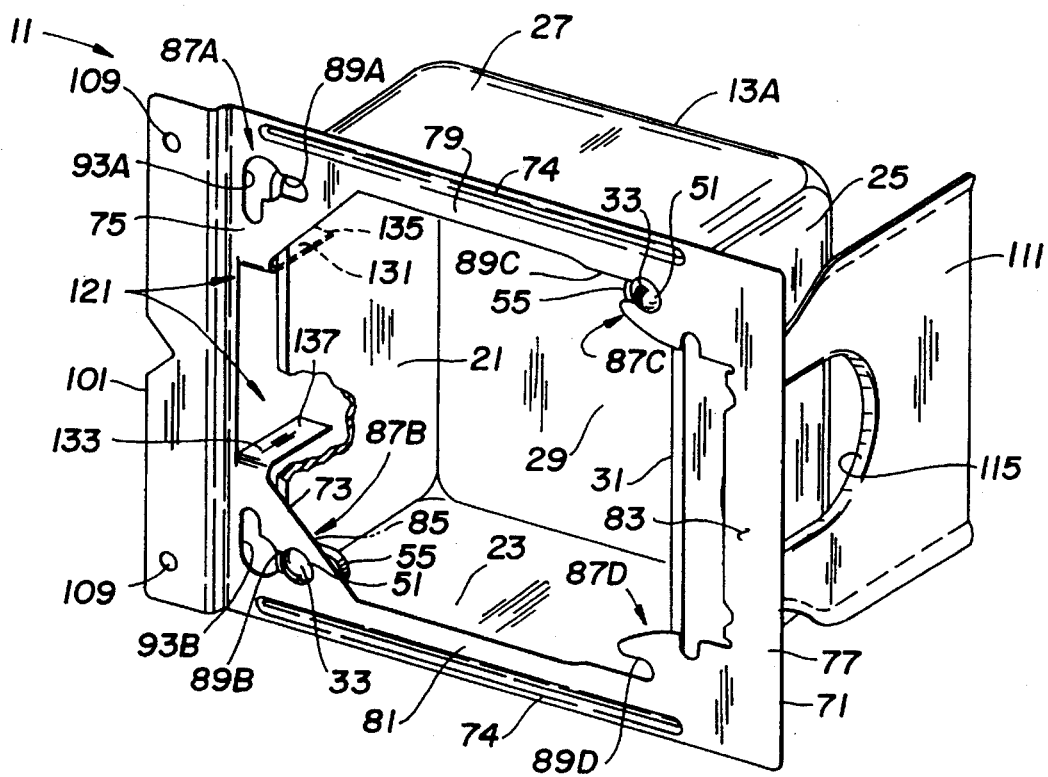
FIG. 6 is a front perspective view of a mounting bracket of a second preferred embodiment showing the bracket supporting a small size outlet box in a locked position.
Figure 7:
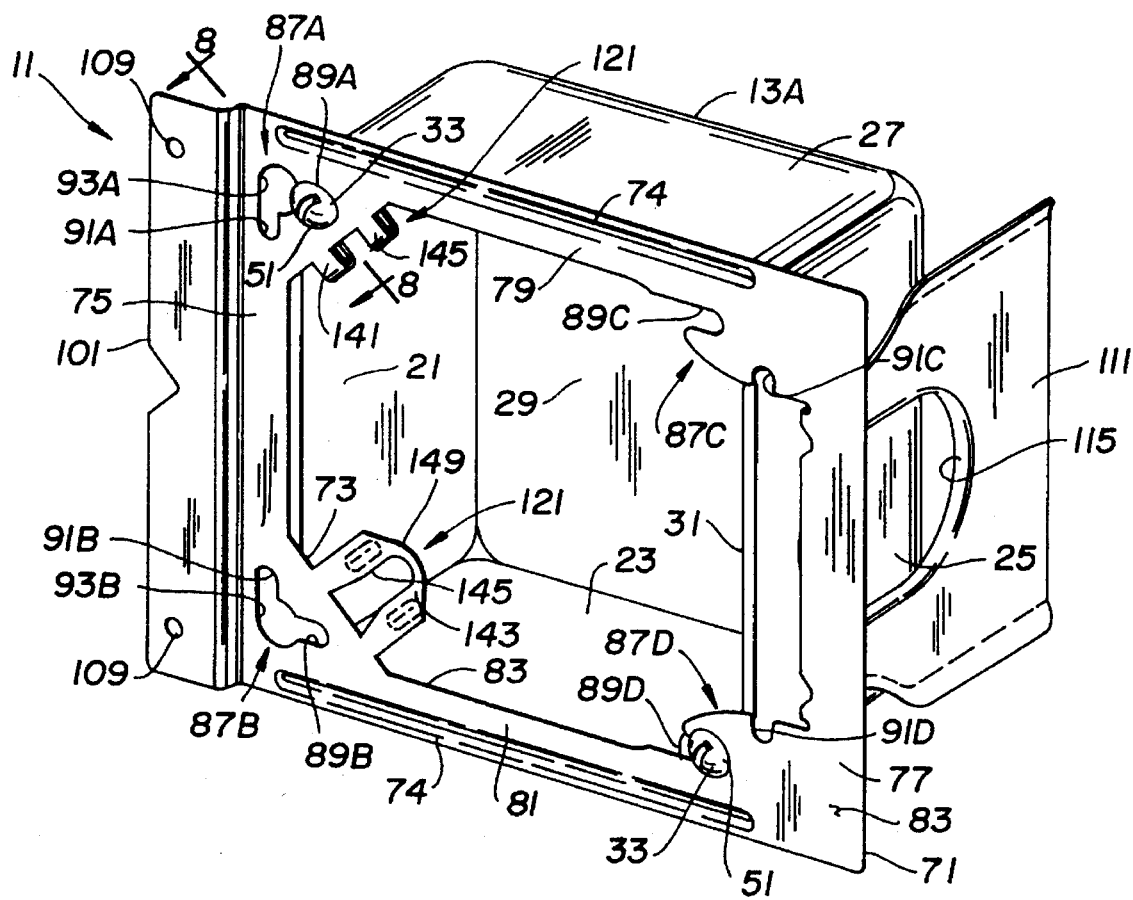
FIG. 7 is a front perspective view of a mounting bracket of a third preferred embodiment showing the bracket supporting a small size outlet box in a locked position.

A stabilizing leg 111 integrally formed with the plate 71 extends rearwardly from the plate for engaging a surface, such as a wall 113, spaced to the rear of the plate. As shown in FIG. 2, the stabilizing leg 111 extends from the right edge margin 77 of the plate 71 opposite from where the flap 101 is located. The stabilizing leg 111 prevents rearward deflection of the mounting bracket 11 in the space between the two walls 17, 113, thus maintaining the plate 71 generally parallel to wall 17. It is to be understood that the stabilizing leg 111 may have many configurations, as long as it serves the stated function. The stabilizing leg 111 may be formed, for example, by stamping or punching the leg from the sheet metal plate 71 when forming the large central opening 73 such that the leg is integral with the inside left-hand edge of the right edge margin 77 and extends rearwardly from the plate. As shown in FIGS. 5–7, an aperture 115 is formed in the stabilizing leg for passage of wires (not shown) into the outlet box.

The opening formations 87A, 87B, 87C and 87D are so configured and arranged that the electrical outlet box 13A may be moved to a first position in which its front opening 31 is closely adjacent the rear face 85 of the plate 71 and in which the heads 51 of the mounting screws 33 are disposed forward of the front face 83 of the plate (see FIGS. 1 and 2). In this first position, one outlet box mounting screw 33 is disposed generally centrally within the screw head clearance opening 93B, and another mounting screw is disposed near the edge of the large central opening 73 adjacent formation 87C. The outlet box 13A is then movable laterally in a direction generally parallel to the plate 71 from the first position (as shown in FIGS. 1 and 2) to a second position (FIGS. 3 and 4) in which the shanks 53 of the mounting screws 33 are received in the screw shank clearance slots 89B, 89C of respective screw opening formations 87B, 87C. In this position, the front opening 31 of the outlet box 13A is generally in register with the central opening 73 of the plate 71. FIG. 5 similarly shows a large size outlet box 13B in its second or locked position in which the mounting screws 33 are received in slots 91B, 91C of respective opening formations 87B, 87C.

In each of the embodiments depicted in the drawings, the mounting bracket 11 comprises at least one locking device, indicated generally at 121, for preventing movement of the outlet box 13A from the second position back to its first position. More specifically, the locking device 121 is formed as an integral part of the bracket 11 and is movable relative to the bracket from a first position in which it is positioned on the bracket for enabling the outlet box 13A to be moved from its first position to its second position, to a second position in which it is positioned on the bracket for preventing movement of the box from its second position back to its first position. By maintaining the outlet box 13A in its second position, the outlet box may be wired without risk of the outlet box falling off the mounting bracket 11, and without the need to first tighten the box mounting screws 33. As a result, a plaster ring 123 may later be installed on the bracket without the need to loosen and then retighten the screws.

Figure 3:
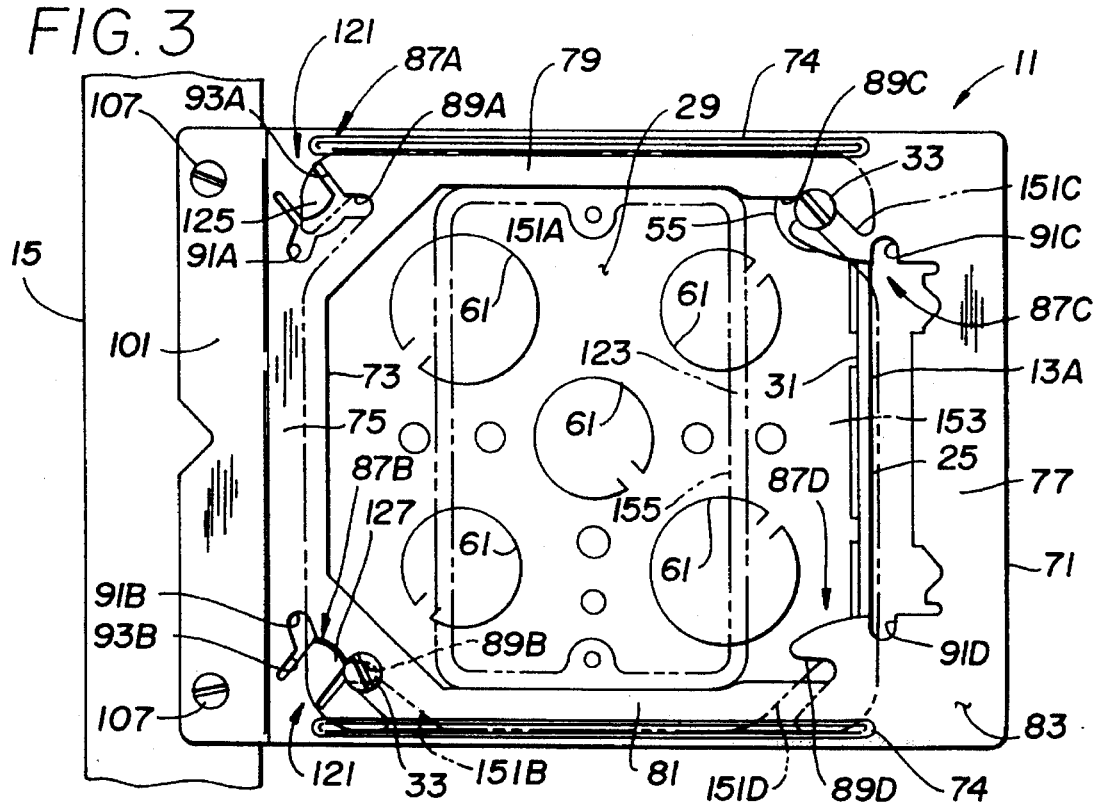
FIG. 3 is a view similar to FIG. 1 showing the mounting bracket supporting the outlet box in a second or locked position.
Figure 4:
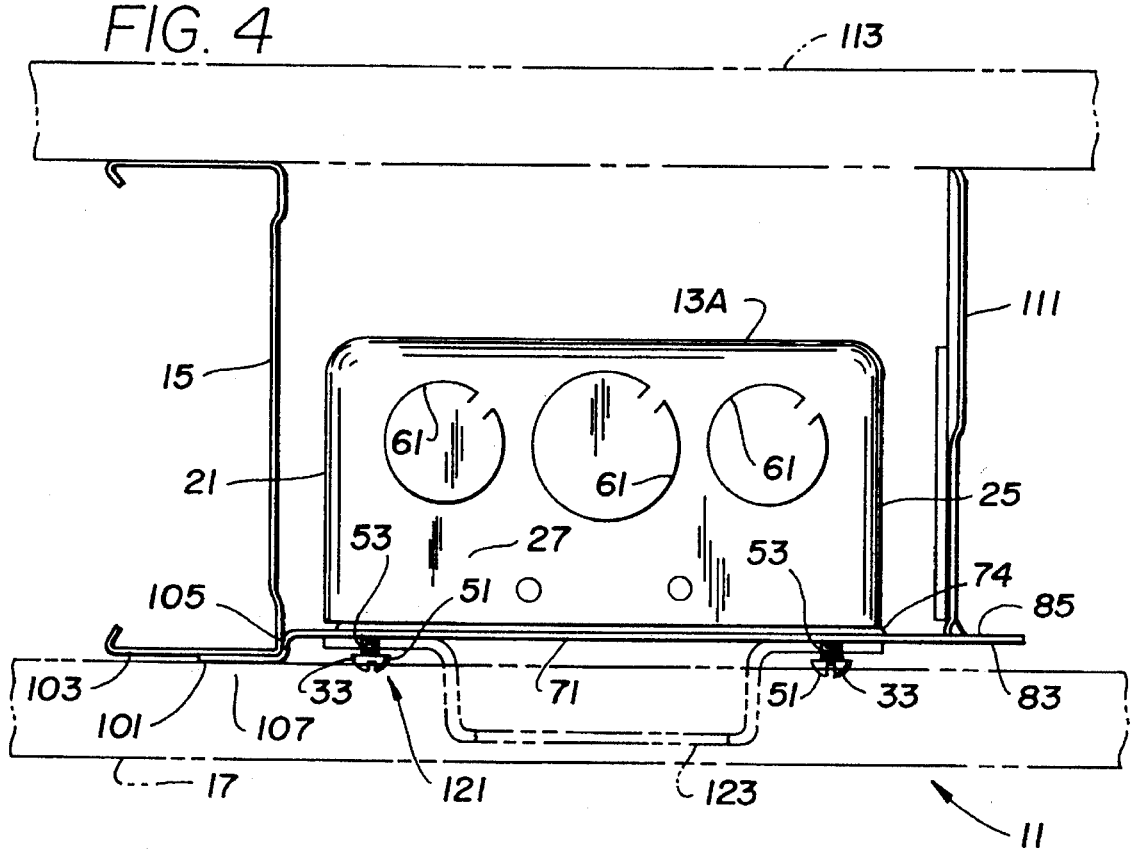
FIG. 4 is a top view of the mounting bracket shown in FIG. 3.

The locking device 121 of the first preferred embodiment (FIGS. 1–5) comprises two sheet metal tabs 125, 127 integrally formed with the sheet metal plate 71 at locations generally adjacent the two left-hand screw opening formations 87A, 87B. It is to be understood that while only one tab 125 or 127 is needed to lock the outlet box in its stated second position, two tabs are provided so that the person installing the outlet box 13A may pass the mounting screws 33 through either set of formations (i.e., formations 87A, 87D or formations 87B, 87C). When disposed in their non-locking position, the tabs 125, 127 are bent forwardly at an angle relative to the plane of the plate 71 (in a first position) to permit the outlet box to be placed in its stated first position and then moved to its stated second position in which the shanks 53 of the mounting screws 33 are received in respective screw shank clearance slots 89 or 91. Each tab is formed so that it may be bent rearwardly to a locking position in which it is generally coplanar with the plate 71 to close or block the open end of a screw shank clearance slot 89 or 91 in which a mounting screw 33 is disposed to prevent the outlet box 13A or 13B from being moved from its second position back to its first position, the outlet box thus being held captive on the bracket. For example, as shown in FIGS. 3 and 4, tab 127, when bent to its locking position, closes the open end of the screw shank clearance slot 89B and is capable of engaging the shank 53 of a mounting screw 33. Thus, the mounting screw 33 is blocked from moving into the screw head clearance opening 93B and the outlet box 13A is effectively locked in its stated second position. It is to be understood that tab 127 is also capable of blocking the open end of slot 91B when mounting a large size outlet box 13B on the plate 71 for blocking movement of the large outlet box 13B to its stated first position. The tabs 125, 127 may be bent to their locking position by hand or by applying force on the front surface of the tab with an implement such as a screw driver (now shown).

The tabs 125, 127 of the first preferred embodiment are formed, at least in part, by the metal removed from the plate 71 to provide the screw head clearance openings 93A, 93B of the left-hand opening formations 87A, 87B. Each tab 125, 127 is formed in the sheet metal plate 71 in a direction generally towards the center of the large central opening 73. It is to be understood that the tabs 125, 127 may be formed in the plate 71 in any orientation and still fall within the scope of the present invention. The tabs 125, 127 may be formed, for example, by stamping the tab from the sheet metal plate with some of the material from either side of each tab 125, 127 completely removed so that the tab is narrower in width than the width of the screw head clearance opening 93.

FIG. 6 illustrates a locking device 121 of a second preferred embodiment capable of engaging a side wall of the outlet box (e.g., side wall 21 of outlet box 13A) for locking the box in its stated second position. The locking device 121 of this embodiment comprises two sheet metal fingers 131, 133 integral with the plate 71 at a location generally adjacent the central opening 73 within left edge margin 75. Two fingers 131, 133 are provided so that the person installing the outlet box 13A and mounting bracket 11 may choose from either tab 131 or 133, or utilize both tabs. The sheet metal fingers 131, 133 may be formed in the plate by stamping, for example. The two fingers 131, 133 are arranged and configured one above the other in a vertical relation with the free ends 135, 137, respectively, adjacent one another. Each finger 131, 133 is bendable from a (first) position in which it is generally coplanar with the plate 71 to a locking (or second) position extending rearwardly from the plate 71 for engagement by the side wall 21 of the outlet box when the box is in its stated second position, thereby holding the box captive in this position so that it may be wired without risk of falling off the bracket. Each finger 131, 133 may be bent rearwardly by hand or by applying force on the front surface of the finger with an implement such as a screw driver (not shown).

Figure 8:
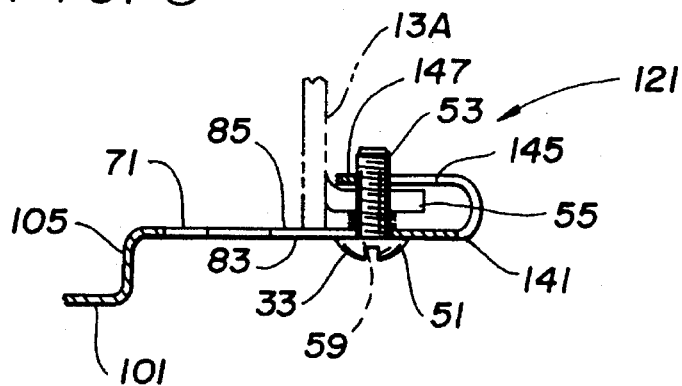
FIG. 8 is an enlarged cross-sectional view taken along line 8—8 in FIG. 7.

FIGS. 7 and 8 illustrate a locking device 121 of a third preferred embodiment which is also capable of locking the outlet box (e.g., outlet box 13A as shown in FIG. 7) in its stated second position. This particular embodiment also has two bendable tabs 141, 143. Each tab 141, 143 is bendable from an extended (first) position rearwardly to a locking position in which it is adjacent the rear face 85 of the plate 71 and is positioned for engaging the shank 53 of a respective mounting screw 33 for preventing the outlet box 13A from being moved from its second position back to its first position. Each tab 141, 143 has a slot 145 positioned generally centrally within the tab and extending substantially the entire length of the tab so that when the tab is bent to its locking position, the slot 145 is capable of receiving the end of the shank 53 of a respective mounting screw 33 projecting rearwardly from the mounting screw tab 55 of the outlet box 13A. Each tab 141, 143 of this embodiment projects inwardly from the edge of the large central opening 73 generally adjacent opening formations 87A, 87B at angles generally corresponding to the angles of tabs 125, 127 of the first preferred embodiment.

Each tab 141, 143 of the third preferred embodiment may be moved to its locking position by forcing the tab rearwardly and folding the tab back upon itself such that the free end 147, 149 of each respective tab is in a parallel relation to the portion of the tab connected to the plate (see FIG. 8). When bending the tab (e.g., tab 141 as shown in FIG. 7) and folding it rearwardly upon itself, the slot 145 must receive the shank 53 of the mounting screw 33 for capturing the mounting screw and thereby preventing the outlet box 13A from moving from its stated second position back to its stated first position. Each tab is adapted to be bent back rearwardly preferably by hand.

In use, the mounting bracket 11 is mounted on a wall stud 15 by means of screw fasteners 107 through openings 109 in the fastening flap 101. An outlet box (e.g., box 13A) is placed on the bracket with the front opening 31 of the outlet box 13A closely adjacent the rear face 85 of plate 71 and with the two mounting screws 33 on the outlet box projecting forwardly through a screw head clearance opening 93A or 93B in the plate 71 and the large central opening 73. The outlet box 13A is then moved from this first position to the stated second position in which the shanks 53 of the mounting screws 33 are received in respective screw shank clearance slots (e.g., slots 89B, 89C in FIG. 1) and the front opening 31 of the outlet box 13A is in registry with the opening 73 in the plate 71. With the outlet box in this position, the locking device 121 is manipulated to lock the box in its stated second position to hold the box captive on the mounting bracket 11 without the need to tighten the mounting screws 33. In the first embodiment (FIGS. 1–5), this involves bending a tab (e.g., tab 127) to block the open end of the screw shank clearance slot (e.g., slot 89B). In the second embodiment, the fingers 135, 137 are bent rearwardly to a position adjacent the side wall 21 of the box. And in the third embodiment, a tab (e.g., tab 141) is bent back to a position in which the shank 53 of a mounting screw 33 is held captive in the slot 145. In any event, the locking device 121 functions to hold the box on the bracket without the need to tighten the mounting screws 33. With the box thus held captive, it may be wired without risk of the box falling off the mounting bracket 11.

After the appropriate electrical connections are made, a standard plaster ring 123 (shown in phantom in FIGS. 3 and 4), may be mounted on the bracket on the front face 83 of the plate 71. It will be observed in this regard that the plaster ring has a peripheral flange 153, a rectangular opening 155 and four screw shank clearance slots 151A, 151B, 151C and 151D positioned in flange 153 for receiving the mounting screws 33 of the outlet box 13A, each of these slots 151 having a width sufficient to receive the shank 53 of the mounting screw 33 but insufficient to permit passage therethrough of the screw head 51. After the plaster ring 123 is mounted on the bracket 11 with the mounting screws of the outlet box received in respective clearance slots 151, the mounting screws are tightened to bring the heads 51 of the screws into clamping engagement with the front surface of the plaster ring flange 153. At this point, the outlet box, mounting bracket and plaster ring are fastened together as a unitary assembly.

Significantly, the above process allows the box to be wired before the plaster ring is mounted on the bracket 11 (thereby allowing full and unobstructed access to the box) and without the need to tighten the mounting screws 33. As a result, the plaster ring can later be mounted on the bracket without having to loosen and retighten the mounting screws. This eliminates a time-consuming step in the installation process and makes it more efficient and less costly.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A bracket for mounting large and small electrical boxes on a wall stud, each electrical box being of the type having side walls, a rear wall, a front opening, and a pair of box mounting screws projecting forward from the box generally adjacent diagonally opposite corners of the front opening of the box, each screw having a screw head and a threaded shank, said bracket comprising:

a sheet metal plate having front and rear faces and a large central opening therein having first and second pairs of diagonally opposite corners, a fastening flap extending from one side of the plate for securement to a wall stud to mount the bracket on the stud in a position wherein the plate extends laterally from the stud at one side of the stud and lies in a generally vertical plane, a first pair of screw opening formations in the plate generally adjacent said first pair of diagonally opposite corners of the central opening in the plate, a second pair of screw opening formations in the plate generally adjacent said second pair of diagonally opposite corners of the central opening in the plate, each formation of said first and second pairs of screw opening formations including first and second relatively narrow screw shank clearance slots each having a width sufficient to receive the shank of a respective box mounting screw but insufficient to permit passage therethrough of said screw head, at least one screw opening formation of each of said first and second pairs of screw opening formations further having a respective screw head clearance opening communicating with open ends of said first and second screw shank clearance slots of the screw opening formation, said first and second screw shank clearance slots extending from the screw head clearance opening generally at right angles relative to one another, the plate being so configured that a small electrical box is adapted to be moved to a first position in which the front of the box is closely adjacent the rear face of the plate and in which the heads of the box mounting screws on the box pass through respective screw head clearance openings and are disposed forward of the front face of the plate, the small box then being movable in a direction generally parallel to the plate from said first position to a second position in which the shanks of the screws are received in said first screw shank clearance slots of respective screw opening formations and in which the front opening of the box is generally in register with the central opening in the plate, the plate being further configured so that a large electrical box is adapted to be moved to a first position in which the front of the box is closely adjacent the rear face of the plate and in which the heads of the box mounting screws on the box pass through respective screw head clearance openings and are disposed forward of the front face of the plate, the large box then being movable in a direction generally parallel to the plate from said first position to a second position in which the shanks of the screws are received in said second screw shank clearance slots of respective screw opening formations and in which the front opening of the box is generally in register with the central opening in the plate, and at least one locking device formed as an integral part of the bracket located adjacent one of said at least one screw head clearance openings and movable relative to the bracket from a first position in which the locking device is positioned on the bracket for enabling said small or large box to be moved from its said first position to its said second position, to a second position in which the locking device is positioned on the bracket for preventing movement of the small or large box from its said second position back to its said first position thereby to lock the box in its said second position and to hold the box captive on the mounting bracket without the need to tighten the box mounting screws to bring the heads of the screws into clamping engagement with the front wall of the bracket.

2. A bracket as set forth in claim 1 wherein said locking device is adapted to engage a side wall of the electrical box to prevent the box from being moved from its said second position back to its said first position.

3. A bracket as set forth in claim 2 wherein said locking device comprises sheet metal finger means integrally formed with said plate at a location generally adjacent said central opening, said finger means being bendable to a locking position extending rearwardly from the plate for engagement by a side wall of the electrical box to prevent the box from being moved from its said second position back to its first position.

4. A bracket as set forth in claim 3 wherein said finger means comprises a pair of spaced apart fingers at a side of the central opening adjacent the fastening flap.

5. A bracket for mounting an electrical box on a wall stud, the electrical box being of the type having side walls, a rear wall, a front opening, and a pair of box mounting screws projecting forward from the box generally adjacent diagonally opposite corners of the front opening of the box, each screw having a screw head and a threaded shank, said bracket comprising:

a sheet metal plate having front and rear faces and a large central opening therein having diagonally opposite corners, a fastening flap extending from one side of the plate for securement to a wall stud to mount the bracket on the stud in a position wherein the plate extends laterally from the stud at one side of the stud and lies in a generally vertical plane, a pair of screw opening formations in the plate generally adjacent said diagonally opposite corners of the central opening in the plate, each formation including a relatively narrow screw shank clearance slot having a width sufficient to receive the shank of a respective box mounting screw but insufficient to permit passage therethrough of said screw head, the plate being so configured that an electrical box is adapted to be moved to a first position in which the front of the box is closely adjacent the rear face of the plate and in which the heads of said box mounting screws are disposed forward of the front face of the plate, the box then being movable in a direction generally parallel to the plate from said first position to a second position in which the shanks of the screws are received in said screw shank clearance slots of respective screw opening formations and in which the front opening of the box is generally in register with the central opening in the plate, and at least one locking device formed as an integral part of the bracket movable relative to the bracket from a first position in which it is positioned on the bracket for enabling said box to be moved from its said first position to its said second position, to a second position in which it is positioned on the bracket for preventing movement of the box from its said second position back to its said first position thereby to lock the box in its said second position and to hold the box captive on the mounting bracket without the need to tighten the box mounting screws to bring the heads of the screws into clamping engagement with the front wall of the bracket, said locking device being engageable with the shank of one of said box mounting screws when the locking device is in its said second position and the box is in its said second position for preventing movement of the box back to its said first position.

6. A bracket as set forth in claim 5 wherein said locking device comprises at least one sheet metal tab integrally formed with said sheet metal plate at a location generally adjacent one of said screw opening formations, said tab being bendable to a locking position in which it is adapted to engage the shank of a screw in the screw shank clearance slot of said one screw opening formation to prevent the box from being moved from its said second position back to its first position.

7. A bracket as set forth in claim 6 wherein said one screw opening formation also has a screw head clearance opening communicating with an open end of said screw shank clearance slot, the head of a respective screw being adapted to pass forwardly through said screw head clearance opening as the electrical box is moved into its said first position, and the shank of said screw being adapted to move into the screw shank clearance slot through said open end thereof as the box is moved to its said second position, said tab, when bent to its said locking position, closing the open end of the screw shank clearance slot of said one screw opening formation.

8. A bracket as set forth in claim 7 wherein said tab is formed, at least in part, by the metal removed from said plate to provide said screw head clearance opening of said one screw opening formation, said tab being generally coplanar with said plate when in its said locking position.

9. A bracket as set forth in claim 6 wherein said box mounting screws are adapted to be threaded through screw tabs projecting from side walls of the box into the front opening of the box, and wherein said bendable tab on the bracket extends into the central opening of the plate and is bendable rearwardly to said locking position in which it generally faces the rear face of the plate and is positioned for engaging the shank of a respective mounting screw for preventing the box from being moved from its second position to its first position.

10. A bracket as set forth in claim 9 wherein said bendable tab has a slot therein arranged and configured so that when the tab is bent to its locking position, said slot is adapted to receive an end of the shank of said box mounting screw projecting rearwardly from said screw mounting tab.

11. A bracket as set forth in claim 5 wherein said pair of screw opening formations constitutes a first pair of screw opening formations, and wherein said bracket further comprises a second pair of screw opening formations, at least one screw opening formation of each pair further comprising a screw head clearance opening communicating with an open end of said screw shank clearance slot, the head of a respective screw being adapted to pass forwardly through said screw head clearance opening as the electrical box is moved into its said first position, and the shank of said screw being adapted to move into the screw shank clearance slot through said open end thereof as the box is moved to its said second position.

12. A bracket as set forth in claim 11 wherein at least one screw opening formation of each pair comprises a screw head clearance opening and two screw shank clearance slots extending from the screw head clearance opening generally at right angles relative to one another, one of said screw shank clearance slots being adapted to receive a mounting screw on an electrical box of relatively small size, and the other of said screw shank clearance slots being adapted to receive a mounting screw on an electrical box of larger size.

13. A bracket as set forth in claim 5 wherein said bracket further comprises a stabilizing leg integrally formed with the plate and extending rearwardly therefrom for engagement with a wall spaced to the rear of said plate.

14. A bracket for mounting an electrical box on a wall stud, the electrical box being of the type having side walls, a rear wall, a front opening, and a box mounting screw projecting forward from the box generally adjacent one of the four corners of the front opening of the box, the screw having a screw head and a threaded shank, said bracket comprising:

a sheet metal plate portion having front and rear faces, a fastening flap extending from one side of the plate portion for securement to a wall stud to mount the bracket on the stud in a position wherein the plate portion extends laterally from the stud at one side of the stud and lies in a generally vertical plane, a screw opening formation in the plate portion, the formation including a relatively narrow screw shank clearance slot having a width sufficient to receive the shank of a respective box mounting screw but insufficient to permit passage therethrough of said screw head, the plate portion being so configured that an electrical box is adapted to be moved to a first position in which at least a portion of the front of the box is closely adjacent the rear face of the plate portion and in which the head of said box mounting screw is disposed forward of the front face of the plate portion, the box then being movable in a direction generally parallel to the plate portion from said first position to a second position in which the shank of the screw is received in said screw shank clearance slot of the screw opening formation, and a locking device formed as an integral part of the bracket movable relative to the bracket from a first position in which it is positioned on the bracket for enabling said box to be moved from its said first position to its said second position, to a second position in which it is positioned on the bracket for preventing movement of the box from its said second position back to its said first position thereby to lock the box in its said second position and to hold the box captive on the mounting bracket without the need to tighten the box mounting screw to bring the head of the screw into clamping engagement with the front wall of the bracket, said locking device being engageable with the shank of said box mounting screw when the locking device is in its said second position and the box is in its said second position for preventing movement of the box back to its said first position.

15. A bracket as set forth in claim 14 wherein said locking device comprises at least one sheet metal tab integrally formed with said sheet metal plate portion at a location generally adjacent said screw opening formation, said tab being bendable to a locking position in which it is adapted to engage the shank of a screw in the screw shank clearance slot of said screw opening formation to prevent the box from being moved from its said second position back to its first position.

16. A bracket as set forth in claim 15 wherein said screw opening formation also has a screw head clearance opening communicating with an open end of said screw shank clearance slot, the head of a respective screw being adapted to pass forwardly through said screw head clearance opening as the electrical box is moved into its said first position, and the shank of said screw being adapted to move into the screw shank clearance slot through said open end thereof as the box is moved to its said second position, said tab, when bent to its said locking position, closing the open end of the screw shank clearance slot of said screw opening formation.

17. A bracket as set forth in claim 16 wherein said tab is formed, at least in part, by the metal removed from said plate portion to provide said screw head clearance opening of said screw opening formation, said tab being generally coplanar with said plate portion when in its said locking position.

18. A bracket as set forth in claim 15 wherein said box mounting screw is adapted to be threaded through a screw tab projecting from a side wall of the box into the front opening of the box, and wherein said bendable tab on the bracket extends from the plate portion and is bendable rearwardly to said locking position in which it generally faces the rear face of the plate portion and is positioned for engaging the shank of the mounting screw for preventing the box from being moved from its second position to its first position.

19. A bracket as set forth in claim 18 wherein said bendable tab has a slot therein arranged and configured so that when the tab is bent to its locking position, said slot is adapted to receive an end of the shank of said box mounting screw projecting rearwardly from said screw mounting tab.

* * * * *